Nov. 15, 1960     F. P. SMITH, JR     2,960,095
CONVERTIBLE CANE-CRUTCH

Filed Feb. 13, 1957     4 Sheets-Sheet 1

INVENTOR.
FRANCIS P. SMITH, JR.
BY
ATTORNEY.

Nov. 15, 1960    F. P. SMITH, JR    2,960,095
CONVERTIBLE CANE-CRUTCH
Filed Feb. 13, 1957    4 Sheets-Sheet 2
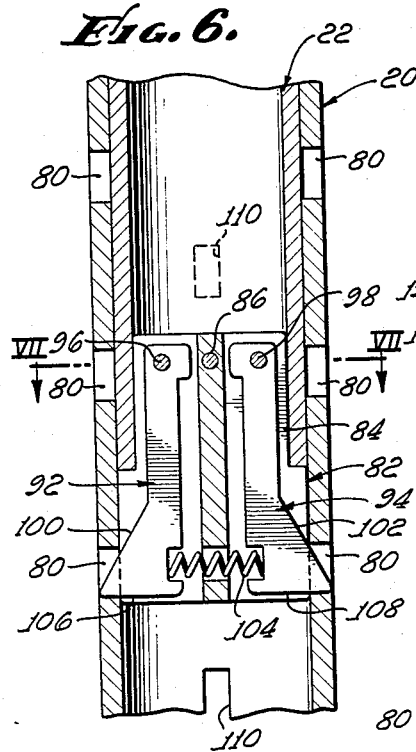
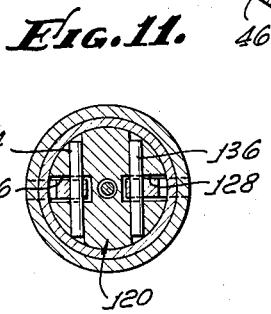
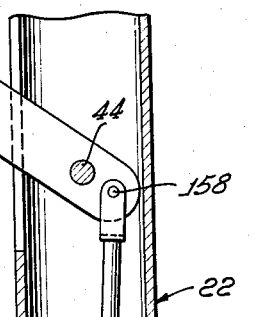
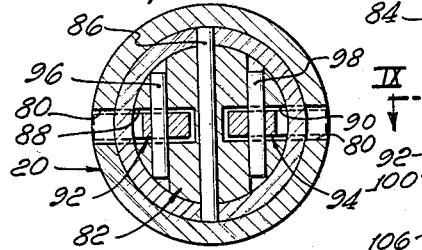
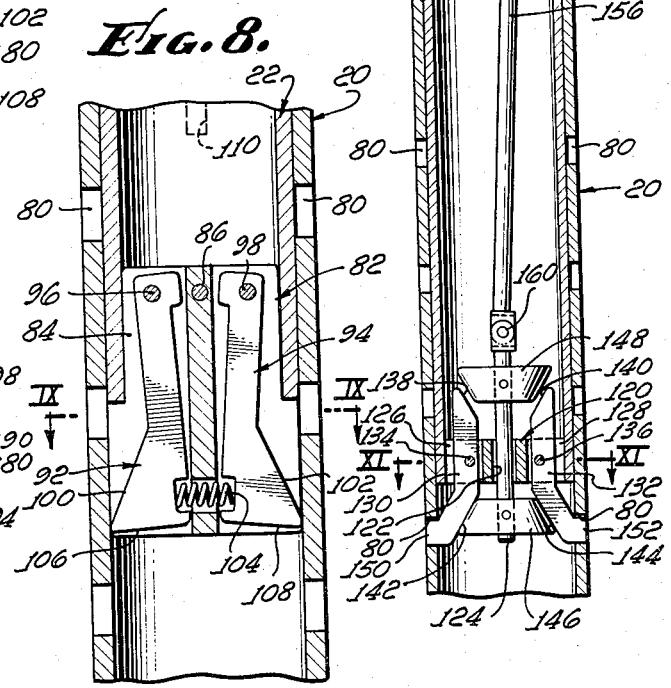
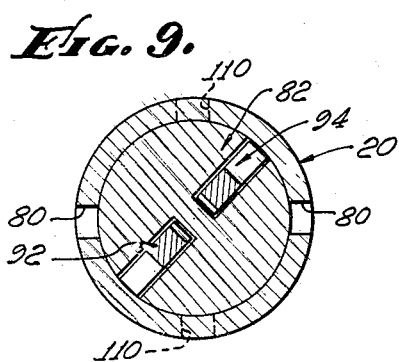
INVENTOR.
FRANCIS P. SMITH, JR.
BY
ATTORNEY.

Nov. 15, 1960     F. P. SMITH, JR     2,960,095
CONVERTIBLE CANE-CRUTCH
Filed Feb. 13, 1957     4 Sheets-Sheet 3
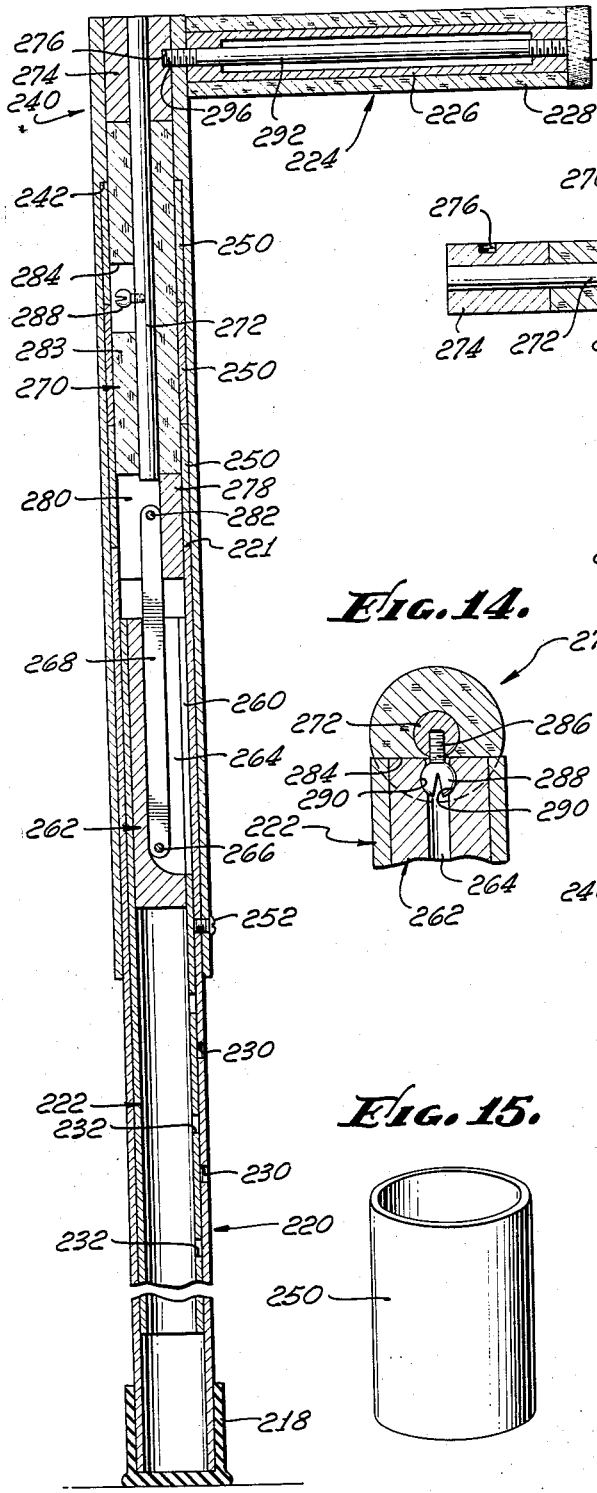
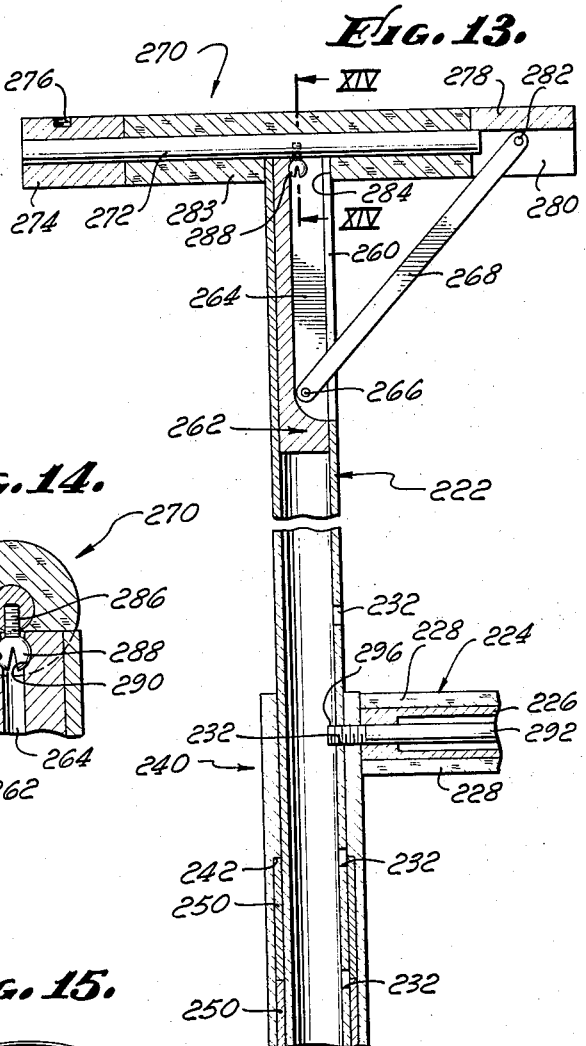
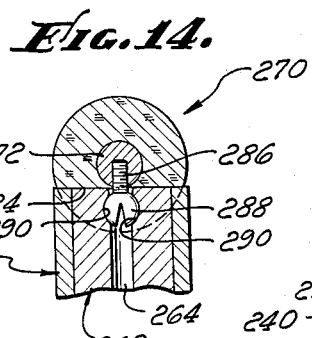
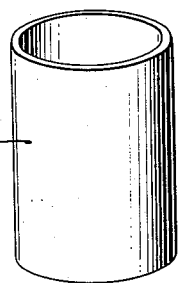
INVENTOR.
FRANCIS P. SMITH, JR.
BY
ATTORNEY.

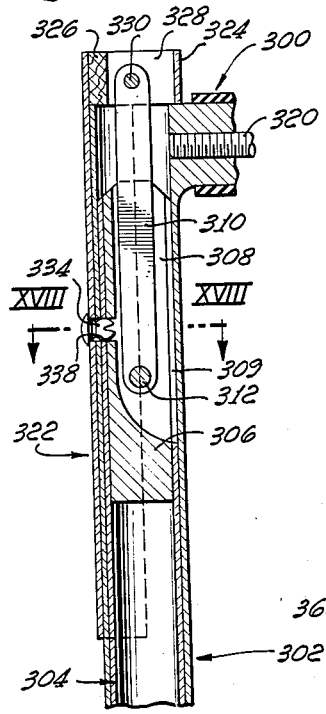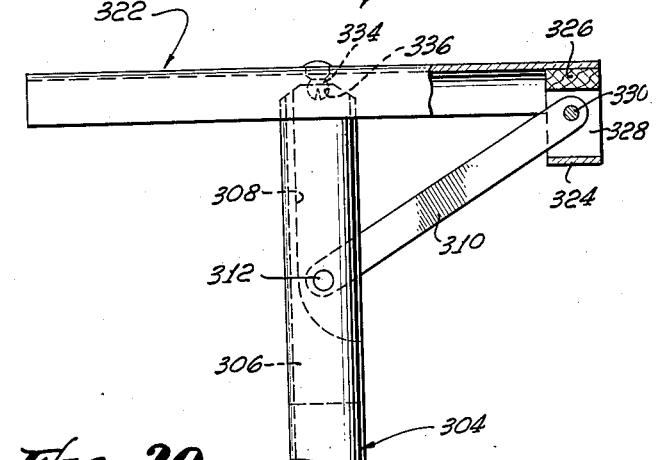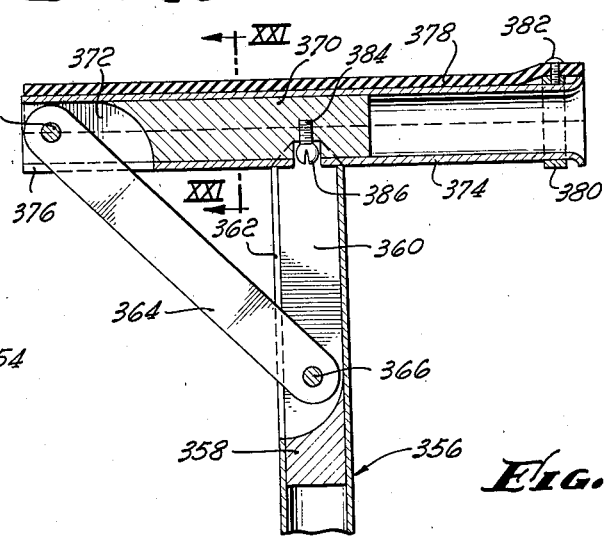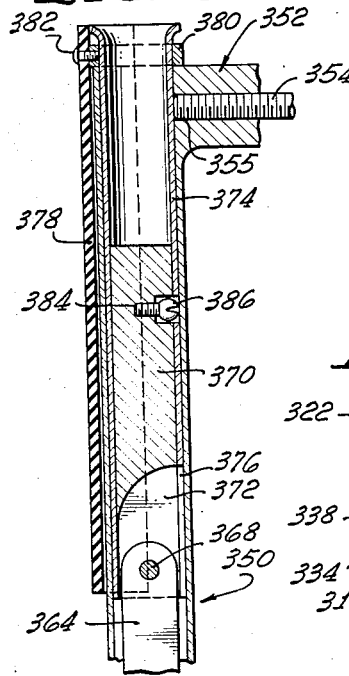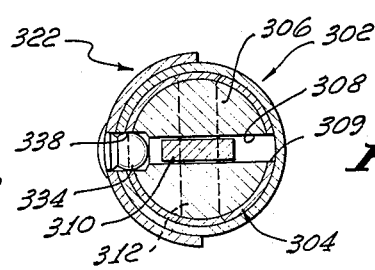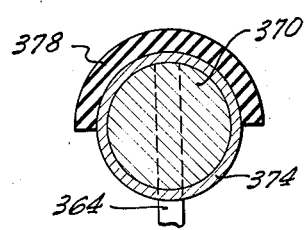

2,960,095

CONVERTIBLE CANE-CRUTCH

Francis P. Smith, Jr., P.O. Box 1432, Ojai, Calif.

Filed Feb. 13, 1957, Ser. No. 639,944

2 Claims. (Cl. 135—49)

This invention relates generally to a device which can be used as a conventional cane or walking-stick and which may be with ease converted for use as a crutch. The invention is more particularly directed to such a device wherein the structural elements forming the crutch may be collapsed so as to be virtually unnoticeable when the device is used as a cane.

The device of the present invention has been developed primarily for use by those who are convalescing from a fractured leg, arthritis or other leg-crippling trouble, wherein it is desirable that the person be encouraged to walk about freely, but at the same time a crutch should be readily available in case of need, if for example, the injured leg shows signs of weakening from over-exertion. In these instances, it is particularly desirable that the cane resemble as nearly as possible a conventional walking-stick, so that the person using the can may not be subjected to the embarrassment which would be attendant upon the continued use of a crutch. To that end, the present invention has for its principal objects, the provision of a device which conceals its crutch functions when used as a cane, which is light in weight, which may be easily and quickly converted from its use as a conventional cane to its use as a crutch, and which is stable in construction as well as low in cost. As will be pointed out later, the device is adjustable as to length, both with respect to the cane use of the device and also the crutch use thereof.

The invention will be better understood by a study of the following description of preferred embodiments thereof, taken in connection with the accompanying drawings, in which:

Fig. 1 is a side elevational view of a device embodying the present invention shown in extended position for use as a crutch.

Fig. 2 is a view similar to Fig. 1 with the crutch portion of the device shown in partly collapsed position.

Fig. 3 is a fragmentary sectional view on an enlarged scale of the upper portion of the crutch portion of the device, with the crutch crossbar shown attached to the upper end of the crutch support tube.

Fig. 4 is a sectional view taken on the line IV—IV of Fig. 3.

Fig. 5 is a sectional view taken on line V—V of Fig. 3.

Fig. 6 is a fragmentary sectional view on an enlarged scale showing one form of the crutch tube locking means, the device being shown in locked position.

Fig. 7 is a sectional view taken on line VII—VII of Fig. 6.

Fig. 8 is a fragmentary sectional view similar to Fig. 6, but showing the crutch tube locking means in unlocked position.

Fig. 9 is a sectional view taken on line IX—IX of Fig. 8.

Fig. 10 is a fragmentary sectional view of an alternative form of the crutch tube locking means actuated into locked or unlocked position by manipulation of the crutch crossbar.

Fig. 11 is a sectional view taken on line XI—XI of Fig. 10.

Fig. 12 is a vertical sectional view of a device of the present invention embodying an alternative form of length-adjusting means for the cane and crutch.

Fig. 13 is a fragmentary vertical sectional view of the device of Fig. 12 shown with the crutch crossbar in assembled relation to serve as a crutch.

Fig. 14 is a sectional view taken on line XIV—XIV of Fig. 13.

Fig. 15 is a perspective view of one of the annular spacer elements used to adjust the device of Figs. 12 and 13 as to height of the cane handle above the ground-engaging portion of the cane.

Fig. 16 is a fragmentary longitudinal sectional view of the upper portion of another modified form of the invention wherein the crutch bar, in collapsed position as shown, extends along one side of the upper portion of the outer sleeve.

Fig. 17 is a fragmentary view, partially in section, of the upper portion of the device of Fig. 16 shown in crutch extended position.

Fig. 18 is a sectional view taken on line XVIII—XVIII of Fig. 16.

Fig. 19 is a fragmentary longitudinal sectional view of the upper portion of a further modification of the invention, the crutch elements being shown in collapsed position.

Fig. 20 is a fragmentary sectional view of the upper portion of the device of Fig. 19 as shown in crutch extended position.

Fig. 21 is a sectional view taken on line XXI—XXI of Fig. 20.

Referring now in detail to the drawings, there is shown in Fig. 1 a device of the present invention including a sleeve indicated generally at 20 and a tubular member indicated generally at 22, the two portions slidably fitting in telescoping relation. Extending laterally from near the upper end of the sleeve 20 is a cane handle indicated generally at 24, and the handle may include adjustable means to be later described for locking the sleeve 20 and the tube 22 in a selected relation. Means are provided for adjusting the height of the handle 24 above the ground, and in the present illustrative embodiment of the invention, such means are shown as including a sleeve extension indicated generally at 26 adapted to telescopically fit at the lower end of the sleeve 20. A ground-engaging cup 28, typically of rubber or similar frictional material, is fitted on the lower end of the sleeve extension 26. The extension is provided with a number of vertically spaced apertures 30 which are desirably threaded to receive a suitable fastening member such as the screw 32, the inner end of the screw being receivable in an opening (not shown) formed in the sleeve 20.

Near the upper end of the tube 22 there is formed a longitudinally extending slot 34 in the side wall of the tube (Fig. 3). An insert member indicated generally at 36 is fitted into the tube 22 and is generally cylindrical in shape to conform with the inner side wall of the tube. It may be fixed in position as shown by any suitable means and the upper portion of the insert 36 is bifurcated to provide a longitudinal slot registering with the slot 34. The upwardly projecting bifurcated legs of the insert member 36 are best seen in Fig. 5 and are indicated at 38 and 40, there being a slot 42 between the two legs. There is provided a pivot pin 44 extending across and fixed to the two legs 38 and 40 of the insert 36 and pivotally attached to the pin 44 is a flat link member 46, the lower portion of the link 46 being receivable in the slot 42 of the insert member 36 when the crutch is disassembled as seen in Fig. 2. A crutch crossbar is pivotally attached to the distal portion of the link 46 as will now be described.

A crutch crossbar indicated generally at 50 is desirably made up of a length of hollow rigid tubing 52 surrounded by an annular sleeve 54 desirably made of a resilient material such as rubber or the like. There may be provided at one end of the crossbar a cap member 56 adapted to be threadedly connected to the tubing 52. Means are provided for pivotally attaching the crossbar 50 to the link 46, and in the present illustrative embodiment of the invention, such means include the provision of a generally cylindrical insert member generally indicated at 58 fixedly mounted within the tubular portion 52 of the crossbar. The insert member 58 is bifurcated at its outer ends and includes a pair of legs (see Fig. 4) 60 and 62, which are separated by a slot 66 formed in the insert member 58 and registering with a slot 70 formed in the side walls of the tubular portion 52 and the resilient substance 54 of the crossbar. A pivot pin 72 is fixed to the legs 54 of the crossbar. A pivot pin 72 is fixed to the legs 60 and 62 of the insert 58 and extends across the slot 66 therebetween, and the distal end of the link 46 is pivotally connected to the pivot pin 72. With particular reference to Figs. 2 and 3, it will be seen that the link 46 is permitted to fit between the legs 38 and 40 of the insert member 36 in the crutch tube and also between the legs 60 and 62 of the insert member 58 in the crutch crossbar.

Means are provided for resiliently retaining the crutch crossbar 50 in its transverse position seen in Figs. 1 and 3. In the present illustration such means include a cylindrical opening 76 formed in the side wall of the resilient substance 54 of the crossbar. The opening 76 is of such diameter as to snugly fit and resiliently grasp the uppermost portion of the tube 22. Such uppermost portion is desirably provided with a saddle configuration as seen in Fig. 1 to furnish a more stable connection with the crossbar 50.

In order that the device of the present invention may be accommodated for use by persons of different heights, means are provided for selectively adjusting the height of the crossbar 50 above the cane handle 24. One form of such means is shown in Figs. 6, 7, 8 and 9. A number of vertically spaced pairs of diametrically opposed openings 80 are formed in the side wall of the sleeve 20 spaced downwardly from the handle 24. A cylindrical plug indicated generally at 82 includes an upper portion 84 of reduced size fitted within the lower end of the tube 22 and fixed therein by suitable means such as a pin 86. The plug 82 is provided with a pair of oppositely disposed slots 88 and 90 (see Fig. 7), in which are housed a pair of ears indicated generally at 92 and 94 respectively, the ears being pivotally connected at their upper ends to pins 96 and 98 carried by the upper portion 84 of the plug 82. The ears are provided toward their lower ends with upwardly directed camming surfaces 100 and 102 and the lower ends of the ears are biased upwardly by suitable resilient means such as a coil spring 104. The lowermost surfaces of the ears 92 and 94 are flat as indicated at 106 and 108, and are adapted to be supported on bottom edges of opposed openings 80 formed in the sleeve 20.

It will be understood that the locking ears 92 and 94 may be withdrawn into unlocked position by moving the tube 22 upwardly relative to sleeve 20. During such movement, the camming surfaces 100 and 102 of the locking ears will, by reason of their abutting contact with the upper edges of the opposed openings 80, cause the outer tips of the ears to be retracted into the position of Fig. 8 and thus disengage from the openings 80. With the parts in the position of Fig. 8, the tube 22 together with the plug 94 and its associated ears, may be rotated relative to the sleeve 20 and the tube may then be telescopically slid downward into fully collapsed position within the sleeve. It may be noted that adjustability in height of the crutch crossbar 50 with respect to the cane handle 24 is provided by the series of vertically spaced opposed openings 80. An additional series of pairs of opposed openings 110 may also be formed in the sleeve 20, angularly spaced from the openings 80 (see Fig. 9).

In Figs. 10 and 11, there is shown a modified form of the invention in which the movement of locking ears into and out of engagement with openings formed in the sleeve 20 is caused by the rotation of the link member 46 from its position as seen in Fig. 1 to its collapsed position in alignment with the tubular member 22. As appears in Fig. 10, an insert member indicated generally at 120 is fixedly mounted in the lower end of the tubular member 22. The insert 120 is generally cylindrical in shape and it is provided with a centrally disposed aperture 122 extending therethrough in which a vertically disposed rod 124 is slidably received. A pair of radially disposed oppositely extending slots 126 and 128 are formed in the insert 120, and a pair of ears 130 and 132 are pivotally carried on pivot pins 134 and 136 which extend across the slots 126 and 128 and are mounted in the body portion of the insert 120. The ears are provided with inwardly directed upper camming surfaces 138 and 140 respectively and with inwardly directed lower camming surfaces 142 and 144 respectively. A pair of camming members 146 and 148 are mounted in spaced relation upon rod 124 and are desirably frustoconical in shape as shown. It will be seen that vertical movement of the rod 124 and its associated camming members 146 and 148 will, by reason of sliding contact with the camming surfaces 138, 140, 142 and 144 of the ears, cause the ears to be actuated into movement about their respective pivot pins 134 and 136. This movement in turn causes the respective dogs 150 and 152 at the lower ends of the ears to be moved outwardly into locking engagement with the openings 80 formed in the side wall of the sleeve 20 or, alternatively, to be retracted from such engagement.

Means are provided for actuating the ears in the manner above described in association with the pivotal movement of link 46 about its pivot 44 in the tubular member 22. In the present illustration these means include the provision of a connecting rod 156 pivotally connected at its upper end to a pin 158 carried near the extreme end of the link 46, the connecting rod 156 being pivotally connected at its lower end 160 to the upper end of the rod 124 on which are mounted the camming members 146 and 148. It will thus be seen that when the parts are in their position of Fig. 10, the angular inclination of link 46 with respect to the tubular member 22 effectively raises the connecting rod 156 and the rod 124, thereby actuating the dogs 150 and 152 into their locked position. When the device is converted from its crutch arrangement to its cane arrangement, the link 46 is rotated clockwise as seen in Fig. 10 about its pivot pin 44, thereby causing the connecting rod 156 and the rod 124 to be moved downwardly, thus retracting the dogs 150 and 152 from their locking engagement in the openings 80 and thereby permitting the tube 22 to be slid inwardly and housed within the sleeve 20.

In Figs. 12 and 13 there is shown a further modification of the invention including an alternative means for facilitating the adjustment of the height of the cane handle above ground level, as well as alternative means for facilitating the adjustment of the height of the crutch crossbar above the cane handle. An elongated sleeve indicated generally at 220 may be provided at its lower end with a ground-engaging cap 218 made of rubber or similar frictional material. The sleeve 220 terminates upwardly in an annular upper edge 221 and an elongated hollow tubular member indicated generally at 222 is slidably housed within the sleeve 220 in telescoping relation. Sleeve 220 may be provided with a number of vertically spaced, preferably threaded openings 230, and the tubular member 222 may also be provided with a series of such vertically spaced openings 232. A cane handle indicated generally at 224 is desirably made up of a central rigid core 226, desirably of metal, and the handle may also include an outer covering, annular in shape and fitting around the core 226, the resilient material being cork, rubber or similar substance, the annular resilient material being indicated at 228. The rigid core 226 of the handle is rigidly fixed to, and may be formed integrally with a handle extension indicated generally at 240, the latter constituting a downwardly extending tubular body. The inner diameter of the handle extension 240 is, in the upper portion of the extension, sufficient to slidably receive the tubular member 222, and in the lower portion of the handle extension the inner diameter is enlarged so that the sleeve 220 may be slidably received within such lower portion of the handle extension. At the juncture of the two portions of the handle extension 240, there is an annular downwardly directed shoulder 242.

Means are provided by which to selectively adjust the height of the cane handle 224 above the ground level upon which rests the ground-engaging member 218. One or more spacer sleeves 250 (see Fig. 15) may be placed within the handle extension 240. In the particular structure shown in Fig. 12, it will be seen that there are three such spacer sleeves 250 within the handle extension 240, extending downwardly from the annular shoulder 242 and resting upon the upper edge 221 of the sleeve member 220. A fastener 252 is provided near the lower end of the handle extension 240, and the inner end of the fastener 252 is received in one of the openings 230 formed in the side wall of the sleeve 220, thus retaining the handle extension 240 and the sleeve 220 in assembled relation. It will be understood that the number of spacer sleeves 250 used will depend upon the individual preference of the person using the cane.

The upper end of the tubular member 222 is provided with a longitudinally extending slot 260 formed in the side wall of the tube. Also within the upper end of the tube 222 there is provided an insert indicated generally at 262 which is similarly provided with a slot 264 extending longitudinally to the upper end of the tube 222, the slot 264 being in alignment with the slot 260. Insert 262 includes a pivot pin 266 extending across the slot 264, and the lower end of a link 268 is pivotally attached to the pin 266. A crutch crossbar indicated generally at 270 may include a central rod 272 made of rigid material such as metal or the like and a metallic end member 274 in which is formed a threaded recess 276. The other end of the crossbar 270 desirably includes a metallic end member 278 provided with a longitudinally extending slot 280 and a pivot pin 282 extending across the slot 280. The upper end of the link member 268 is pivotally connected to the pivot pin 282. Between the end members 274 and 278 of the crossbar 270, there may be provided a quantity of resilient material 283 formed in annular shape surrounding the rod 272. Centrally of the crossbar 270 there is desirably formed an opening 284 in the resilient material 283 to receive the upper end of the tubular member 222 when the crossbar is in operative position as seen in Fig. 13. Desirably a resiliently engageable element may be provided to prevent inadvertent disassembly of the crossbar 270 from the upper end of the tube 222. In the present illustration an element 286 (see Fig. 14), is fixed to the central rod 272 of the crossbar and extends downwardly therefrom. The head of the element 286, indicated at 288 is desirably of resilient construction and may thus be received in recesses 290 formed in the slot 264 of the insert 262. The expansible elements 288 of the fastening element 286 thus serve to detachably secure the crossbar 270 in its assembled position.

Adjustability of the crossbar 270 above the cane handle 224 is afforded by engagement of a threaded rod member within the handle 224 with a selected one of the openings 232 formed in the side wall of the tubular member 222. An elongated rod 292 extends throughout the length of the handle 224 and is threadedly engaged with the core 226. The rod is desirably provided with a knob portion 294 at its outer end and at its inner end 296 (see Fig. 12), is adapted to extend into one of the openings 232 of the tube 222. When the device is converted to its use as a cane only, the inner end 296 of the rod 292 is received in the threaded opening 276 of the crossbar 270, and thereby retains the entire crutch mechanism within the cane structure including the cane handle extension 240 and the main tubular member 220.

For the comfort of the user to provide a crutch crossbar of somewhat greater diameter as seen in section than in the case of the bars heretofore described which are adapted to be received within the sleeve of the device. This may be easily accomplished in accordance with the present invention by forming the crutch crossbar to be in the shape of a semi-cylindrical member throughout the major portion of its length, such semi-cylindrical member being adapted to lie along and partially surround the outside of the upper portion of the sleeve. This modified form of the invention is similar to the invention as heretofore described except as particularly illustrated in Figs. 16, 17, and 18.

According to this form of the invention, there is provided a handle indicated generally at 300 fixed to the upper end of a cylindrical sleeve indicated generally at 302, and a tube indicated generally at 304 is longitudinally slidable within the sleeve 302. The upper end of the tube 304 is provided with an insert member 306 having formed therein an upwardly extending longitudinal slot 308 registering with a slot 309 formed in tube 304 and in which may be received a link 310 which is pivotally attached at 312 to the insert member 306, the pivotal connection 312 extending across the slot 308 formed in the insert. The handle 300 is desirably provided with a locking rod 320, desirably threaded within the handle, and it will be understood that the parts thus far described in Fig. 16 correspond closely to the parts heretofore described in connection with the embodiment shown in Fig. 3.

The crutch crossbar in accordance with this form of the invention is indicated generally at 322 and throughout the major portion of its length is in the form of a semi-cylindrical shell as best appears in Fig. 18. At one end of the cross bar 322 the material of which the crossbar is made, which is desirably lightweight metal, is formed in ring shape as seen at 324 and is provided with an insert member 326 having formed therein a slot 328. The upper end of the link 310 is pivotally connected at 330 to a pin extending across the slot 328 and carried by the insert 326. The inside diameter of the semi-cylindrical portion of the crossbar 322 is selected so that the bar fits and partially embraces the outside diameter of the sleeve 302. Approximately midway of the length of crossbar 322, there is provided an inwardly extending resilient split pin 334, fixed at its outer end to the crossbar and having an inner end which is resiliently receivable in a suitably formed recess 336 in the upper end of the insert 306 carried by the tube 304, as appears in Fig. 17, or alternatively, is receivable in a similarly formed recess 338 in the side wall of the sleeve 302, the tube 304 and the insert 306 as appears in Fig. 16.

It will be readily understood from the foregoing description that the modified form of the invention shown in Figs. 16, 17 and 18 operates similarly to that previously described in connection with, for example, Fig. 3, save that the crossbar in collapsed position as seen in Fig. 16 extends on the outside of the sleeve 302 in contrast with the earlier described form of the invention in which the crossbar lies within the sleeve when in collapsed position. It may be noted also that in the form of the invention now under discussion, there is appreciably greater rigidity afforded by the structure when it is in extended or crutch position by reason of the greater length of tube 304 received within sleeve 302.

A further modified form of the invention is shown in Figs. 19, 20 and 21. This form of the invention partakes of the principal advantages of the form of the invention shown in Figs. 16, 17 and 18, in that there is provided a crutch crossbar of substantially larger diameter than that provided by the embodiment of the invention shown, for example, in Fig. 3. The device of Fig. 19 is similar to that shown in Figs. 1 to 15 except that it makes use of a semi-cylindrical member as part of the crutch crossbar, and this semi-cylindrical member is made of a resilient material such as rubber or equivalent, attached at one end to the upper end of the crossbar.

As best appears in Fig. 19, this modification includes a sleeve, the upper portion of which is indicated generally at 350, having attached thereto at its upper end a laterally extending handle, fragmentarily indicated generally at 352. This handle includes an axially movable threadedly engaged locking rod 354 having an end 355 which is selectively engageable in the manner heretofore described with suitably formed openings in the lower part (not shown) of a tube indicated generally at 356 which is slidably receivable in the sleeve 350. As appears in Fig. 20, the tube 356 is provided at its upper end with an insert 358, and a slot 360 is formed in the insert extending longitudinally of the tube 356 and registering with a slot 362 formed in the side wall of the tube. A link 364 is pivotally connected at one end by means of a pivot pin 366 to the insert 358, the pivot pin 366 extending across the slot 360. The other end of the link is pivotally connected at 368 to a pin carried by an insert 370 and extending across a slot 372 formed in the insert. The insert is fixed within a cylindrical crutch crossbar 374 having a slot 376 registering with slot 372.

A semi-cylindrical resilient member 378 extends the length of crossbar 374 and is attached to the distal end thereof by suitable means such as ring 380 and fastener 382. Member 378 may be made of rubber or equivalent material and overlies and partially surrounds crossbar 374 when the parts are in the position shown in Fig. 20. A retaining pin 384 is carried by the insert 370 substantially midway of the length of crossbar 374, the pin having a resilient split head 386 receivable in a recess formed in the upper end of insert 358 substantially in the manner heretofore described in connection with Fig. 14.

By a comparison of Figs. 19 and 20 it will be seen that when in the collapsed position of Fig. 19, the resilient member 378 extends along the outside of sleeve 350, with a portion of the sleeve wall separating it from crossbar 374 inside the sleeve. When the device is in the extended position of Fig. 20 the resilient member rests upon crossbar 374 and affords a resilient surface to fit the armpit of the user.

Accordingly it will be seen that in all forms of the present invention the crutch linkage mechanism and support tube may be completely received in the outer sleeve of the device so that the crutch function can be concealed when desired. Where additional width or resiliency of the crossbar are called for, the present construction permits this in accordance with the forms of the invention last described. Modifications and changes from the specific forms of the invention illustratively disclosed herein are contemplated and are intended to be embraced within the scope of the appended claims.

I claim:

1. A convertible cane-crutch comprising: an elongated hollow rigid sleeve; a handle extension including an elongated hollow sleeve having a lower sleeve portion adapted to telescopically fit around an upper extent of the first named sleeve, the upper boundary of said lower sleeve portion being defined by a downwardly directed inner annular shoulder; a selected number of annular spacer sleeves having inner and outer diameters equal to those of the first named sleeve, said shoulder being adapted to rest upon and be supported by, selectively, the upper annular edge of said first named sleeve or the upper edge of a spacer sleeve disposed in coaxial prolongation thereof; means for selectively locking the first named sleeve and handle extension against relative longitudinal movement; an elongated rigid member having a longitudinally extending slot formed therein in one end portion thereof; a link receivable in the slot and pivotally connected to the rigid member; a cross-bar pivotally connected to the distal end of the link, the rigid member, link and crossbar being slidably receivable in the first named sleeve and an upper sleeve portion of the handle extension; and means for locking the elongated member against longitudinal movement relative to the handle.

2. The invention as stated in claim 1 wherein said rigid member is provided with a series of vertically spaced recesses formed therein below the attachment with the link and wherein said last named means includes an inwardly projectable locking rod carried by the handle and having an inner end receivable in a selected one of said recesses.

References Cited in the file of this patent

UNITED STATES PATENTS

| | | |
|---|---|---|
| 1,361,733 | Jones | Dec. 7, 1920 |
| 1,400,394 | Warry | Dec. 13, 1921 |
| 1,520,569 | Emerson | Dec. 23, 1924 |
| 2,388,778 | Wheeler | Nov. 13, 1945 |
| 2,429,409 | Eidman | Oct. 21, 1947 |
| 2,590,607 | Grimball | Mar. 25, 1952 |